(12) United States Patent
Taherzadeh Boroujeni et al.

(10) Patent No.: US 11,558,905 B2
(45) Date of Patent: Jan. 17, 2023

(54) ALTERNATIVE MODULATION FOR A RANDOM ACCESS MESSAGE IN A TWO-STEP RANDOM ACCESS PROCEDURE

(71) Applicant: QUALCOMM Incorporated, San Diego, CA (US)

(72) Inventors: Mahmoud Taherzadeh Boroujeni, San Diego, CA (US); Juan Montojo, San Diego, CA (US); Tao Luo, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 17/247,207

(22) Filed: Dec. 3, 2020

(65) Prior Publication Data
US 2021/0243816 A1    Aug. 5, 2021

Related U.S. Application Data

(60) Provisional application No. 62/968,913, filed on Jan. 31, 2020.

(51) Int. Cl.
| | |
|---|---|
| *H04W 4/00* | (2018.01) |
| *H04W 74/08* | (2009.01) |
| *H04L 43/16* | (2022.01) |
| *H04L 5/00* | (2006.01) |
| *H04W 56/00* | (2009.01) |
| *H04L 27/20* | (2006.01) |

(52) U.S. Cl.
CPC ....... *H04W 74/0833* (2013.01); *H04L 5/0048* (2013.01); *H04L 27/20* (2013.01); *H04L 43/16* (2013.01); *H04W 56/001* (2013.01)

(58) Field of Classification Search
None
See application file for complete search history.

(56) References Cited

U.S. PATENT DOCUMENTS

| | | | | |
|---|---|---|---|---|
| 2018/0279186 A1* | 9/2018 | Park | ................ | H04W 36/0077 |
| 2019/0261195 A1* | 8/2019 | Cheng | ............... | H04W 72/0413 |
| 2020/0267768 A1* | 8/2020 | Hakola | ................ | H04L 5/0091 |
| 2021/0144742 A1* | 5/2021 | Jeon | ....................... | H04W 52/50 |

\* cited by examiner

*Primary Examiner* — Zewdu A Beyen
(74) *Attorney, Agent, or Firm* — Qualcomm Incorporated

(57) ABSTRACT

Various aspects of the present disclosure generally relate to wireless communication. In some aspects, a user equipment (UE) may determine a set of modulations for a random access message associated with a two-step random access channel (RACH) procedure. The set of modulations may be either a first set of modulations or a second set of modulations that is different from the first set of modulations. The set of modulations may be determined based at least in part on whether a signal strength satisfies a signal strength threshold. The UE may transmit the random access message based at least in part on the determined set of modulations. The random access message may include a physical uplink shared channel modulated using the determined set of modulations. Numerous other aspects are provided.

30 Claims, 9 Drawing Sheets

ALTERNATIVE MODULATION FOR A RANDOM ACCESS MESSAGE IN A TWO-STEP RANDOM ACCESS PROCEDURE

CROSS-REFERENCE TO RELATED APPLICATION

This Patent Application claims priority to U.S. Provisional Patent Application No. 62/968,913, filed on Jan. 31, 2020, entitled "ALTERNATIVE MODULATION FOR A RANDOM ACCESS MESSAGE IN A TWO-STEP RANDOM ACCESS PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for alternative modulation for a random access message in a two-step random access procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining a set of modulations for a random access message associated with a two-step random access channel (RACH) procedure, wherein the set of modulations is either a first set of modulations or a second set of modulations, the first set of modulations being different from the second set of modulations, and wherein the set of modulations is determined based at least in part on whether a signal strength satisfies a signal strength threshold; and transmitting the random access message based at least in part on the determined set of modulations, the random access message including a physical uplink shared channel (PUSCH) modulated using the determined set of modulations.

In some aspects, a method of wireless communication, performed by a base station, may include receiving, from a UE, a random access message associated with a two-step RACH procedure; determining, based at least in part on the random access message, a set of modulations associated with the random access message, wherein the set of modulations is either a first set of modulations or a second set of modulations, the first set of modulations being different from the second set of modulations; and processing the random access message based at least in part on the determined set of modulations associated with the random access message, the random access message including a PUSCH modulated using the determined set of modulations.

In some aspects, a UE for wireless communication may include a memory and one or more processors operatively coupled to the memory. The memory and the one or more processors may be configured to determine a set of modulations for a random access message associated with a two-step RACH procedure, wherein the set of modulations is either a first set of modulations or a second set of modulations, the first set of modulations being different from the second set of modulations, and wherein the set of modulations is determined based at least in part on whether a signal strength satisfies a signal strength threshold; and transmit the random access message based at least in part on the determined set of modulations, the random access message including a PUSCH modulated using the determined set of modulations.

In some aspects, a base station for wireless communication may include a memory and one or more processors operatively coupled to the memory. The memory and the one or more processors may be configured to receive, from a UE, a random access message associated with a two-step RACH procedure; determine, based at least in part on the random access message, a set of modulations associated with the random access message, wherein the set of modulations is either a first set of modulations or a second set of modulations, the first set of modulations being different from the second set of modulations; and process the random access message based at least in part on the determined set of modulations associated with the random access message, the random access message including a PUSCH modulated using the determined set of modulations.

In some aspects, a non-transitory computer-readable medium may store one or more instructions for wireless communication. The one or more instructions, when executed by one or more processors of a UE, may cause the one or more processors to determine a set of modulations for a random access message associated with a two-step RACH procedure, wherein the set of modulations is either a first set of modulations or a second set of modulations, the first set of modulations being different from the second set of modulations, and wherein the set of modulations is determined based at least in part on whether a signal strength satisfies a signal strength threshold; and transmit the random access message based at least in part on the determined set of modulations, the random access message including a PUSCH modulated using the determined set of modulations.

In some aspects, a non-transitory computer-readable medium may store one or more instructions for wireless communication. The one or more instructions, when executed by one or more processors of a base station, may cause the one or more processors to receive, from a UE, a random access message associated with a two-step RACH procedure; determine, based at least in part on the random access message, a set of modulations associated with the random access message, wherein the set of modulations is either a first set of modulations or a second set of modulations, the first set of modulations being different from the second set of modulations; and process the random access message based at least in part on the determined set of modulations associated with the random access message, the random access message including a PUSCH modulated using the determined set of modulations.

In some aspects, an apparatus for wireless communication may include means for determining a set of modulations for a random access message associated with a two-step RACH procedure, wherein the set of modulations is either a first set of modulations or a second set of modulations, the first set of modulations being different from the second set of modulations, and wherein the set of modulations is determined based at least in part on whether a signal strength satisfies a signal strength threshold; and means for transmitting the random access message based at least in part on the determined set of modulations, the random access message including a PUSCH modulated using the determined set of modulations.

In some aspects, an apparatus for wireless communication may include means for receiving, from a UE, a random access message associated with a two-step RACH procedure; means for determining, based at least in part on the random access message, a set of modulations associated with the random access message, wherein the set of modulations is either a first set of modulations or a second set of modulations, the first set of modulations being different from the second set of modulations; and means for processing the random access message based at least in part on the determined set of modulations associated with the random access message, the random access message including a PUSCH modulated using the determined set of modulations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
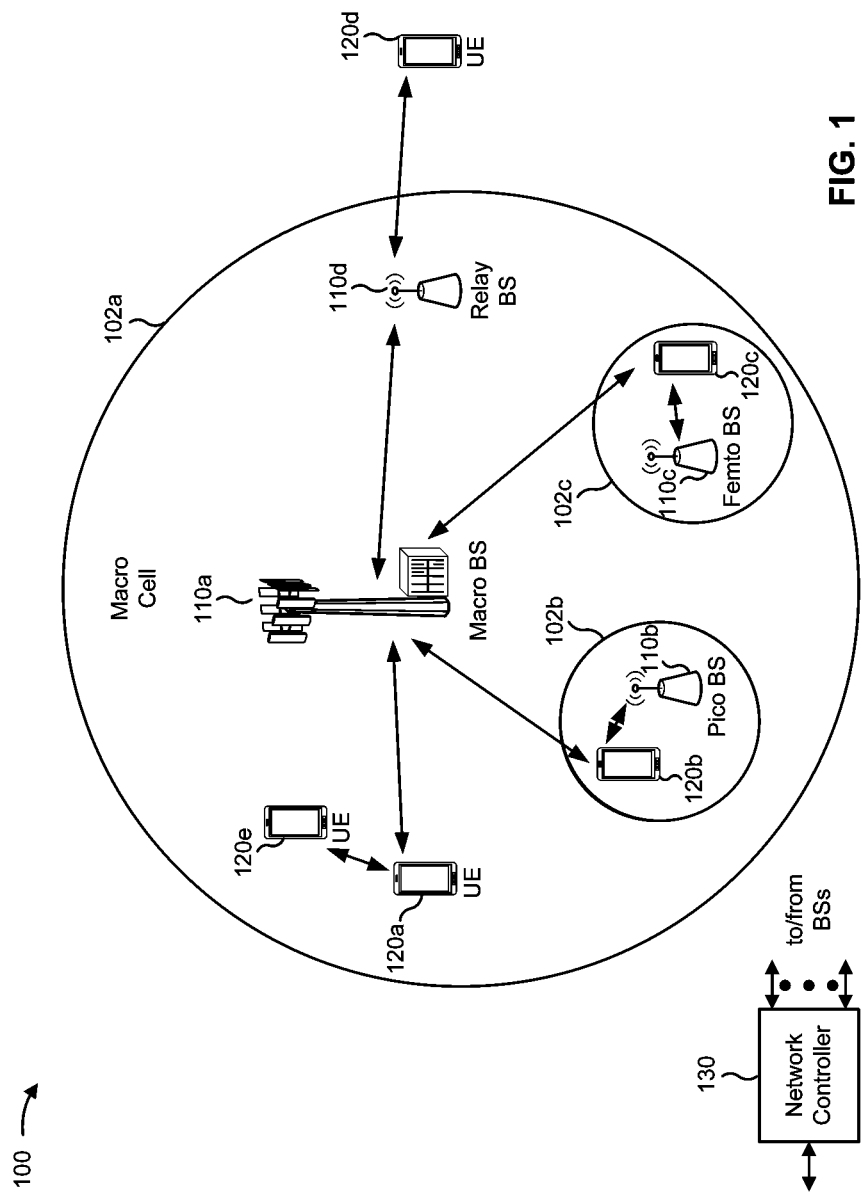
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a UE 120 and/or a base station 110 may perform one or more operations associated with selecting a set of modulations for a random access message in a two-step random access procedure. For example, the UE 120 may determine a set of modulations for a random access message associated with the two-step RACH procedure, as described herein. In some aspects, the message type may be either a first set of modulations or a second set of modulations, where the second set of modulations is selected or designed to provide coverage enhancement for the random access message. In some aspects, the UE 120 may determine the set of modulations based at least in part on whether a signal strength satisfies a threshold. After determining the set of modulations, the UE 120 may transmit the random access message accordingly (e.g., by modulating a PUSCH payload of the random access message using the determined set of modulations). In some aspects, a base station 110 may receive the random access message associated with the two-step RACH procedure, determine the set of modulations, and process the random access message accordingly, as described herein. In this way, benefits provided by the two-step RACH procedure (e.g., reduction in signaling overhead and/or latency, improvement in RACH capacity and/or power efficiency) can be realized, while coverage of the random access message may be increased.

As indicated above, FIG. 1 is provided as an example. Other examples may differ from what is described with regard to FIG. 1.

Figure 2:
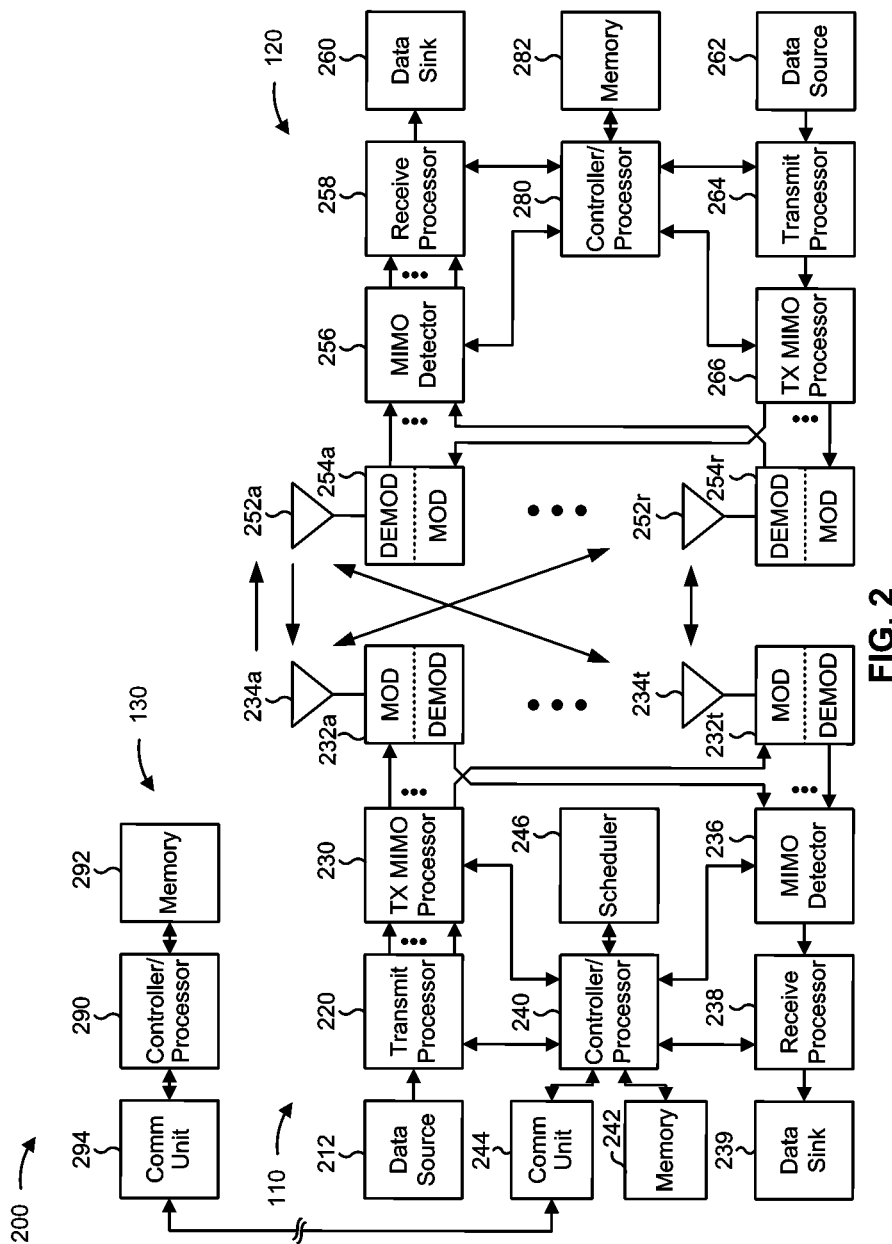
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with alternative modulation for a random access message in a two-step random access procedure, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for determining a set of modulations for a random access message associated with a two-step RACH procedure, wherein the set of modulations is either a first set of modulations or a second set of modulations, the first set of modulations being different from the second set of modulations, and wherein the set of modulations is determined based at least in part on whether a signal strength satisfies a signal strength threshold; means for transmitting the random access message based at least in part on the determined set of modulations, the random access message including a PUSCH modulated using the determined set of modulations; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE (e.g., a UE 120), a random access message associated with a two-step RACH procedure; means for determining, based at least in part on the random access message, a set of modulations associated with the random access message, wherein the set of modulations is either a first set of modulations or a second set of modulations, the first set of modulations being different from the second set of modulations; means for processing the random access message based at least in part on the determined set of modulations associated with the random access message, the random access message including a PUSCH modulated using the determined set of modulations; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A two-step RACH procedure includes two steps (rather than four steps, as in a traditional four-step RACH procedure). The two-step RACH procedure can, in some cases, provide a reduction in signaling overhead and/or latency, and can provide improvement in RACH capacity and/or power efficiency. In the two-step RACH procedure, a UE transmits a random access message (referred to as msgA) that includes a preamble and a payload (e.g., a physical uplink shared channel (PUSCH) payload) of a configurable size (e.g., from a few bytes to a few hundred bytes). The preamble may assist with a timing offset estimation performed by a base station. In general, the UE transmits the preamble and then transmits the payload after a configurable amount of time (e.g., including a guard period and/or a transmission gap). Here, the configurable amount of time may serve to mitigate interference (e.g., inter-symbol interference (ISI), inter-carrier interference (ICI), and/or the like). The preamble and the payload can be transmitted in the same slot or in different slots.

Multiple UEs performing the two-step RACH procedure can share a same PUSCH occasion. That is, multiple UEs performing the two-step RACH procedure can share a same set of resources for transmitting random access message payloads. Such sharing may occur when, for example, the random access messages of the multiple UEs use similar modulation and coding schemes (MCSs), similar waveforms, or similar payload sizes. Resource allocation for a given PUSCH occasion can be specified relative to a RACH occasion (e.g., a set of resources for transmitting random access message preambles), for example, by semi-statically or dynamically configured offsets in time and/or frequency. Both separate and shared RACH occasions can be configured for two-step RACH. Further, when a RACH occasion is shared between a two-step RACH procedure and a four-step RACH procedure, a pool of preambles can be partitioned into mutually exclusive subsets, each of which is associated with a different type of RACH procedure.

A base station may receive the random access message associated with the two-step RACH procedure, and may detect the preamble and decode the payload. The base station may then transmit a random access response (referred to as msgB in the case of a two-step RACH procedure) to the UE. The random access response includes a physical downlink control channel (PDCCH) communication and a physical downlink shared channel (PDSCH) payload. Here, the PDCCH communication identifies a set of resources of the PDSCH payload that carries information for the UE. The PDSCH payload can include, for example, contention resolution information for the UE, a cell radio network temporary identifier (C-RNTI) for the UE, a timing advance (TA) command for the UE, and/or the like.

As described above, the aim of the two-step RACH procedure is to provide a reduction in signaling overhead and/or latency, and an improvement in RACH capacity and/or power efficiency (e.g., as compared to the four-step RACH procedure). It is therefore desirable to enable increased coverage of the random access message of the two-step RACH procedure (e.g., to allow the two-step RACH procedure to be used, while achieving acceptable coverage). In some cases, coverage enhancement for the random access message of the two-step RACH procedure can be provided by supporting different modulations for the payload portion of the random access message.

Some techniques and apparatuses described herein provide techniques and apparatuses for selection of a set of modulations for a random access message of a two-step RACH procedure. In some aspects, a UE may determine a set of modulations for the random access message associated with the two-step RACH procedure, where the set of modulations is either a first set of modulations (e.g., quadrature phase shift keying (QPSK), 16 quadrature amplitude modulation (QAM), 64 QAM, and/or the like) or a second set of modulations (e.g., an alternative to the first set of modulations, such as a π/2 binary phase shift keying (BPSK) modulation). In some aspects, the UE may determine the set of modulations based at least in part on whether a signal strength satisfies a signal strength threshold. In this way, the above-described benefits of the two-step RACH procedure can be realized, while coverage of the random access message may be increased. Additional details are described below.

Figure 3:
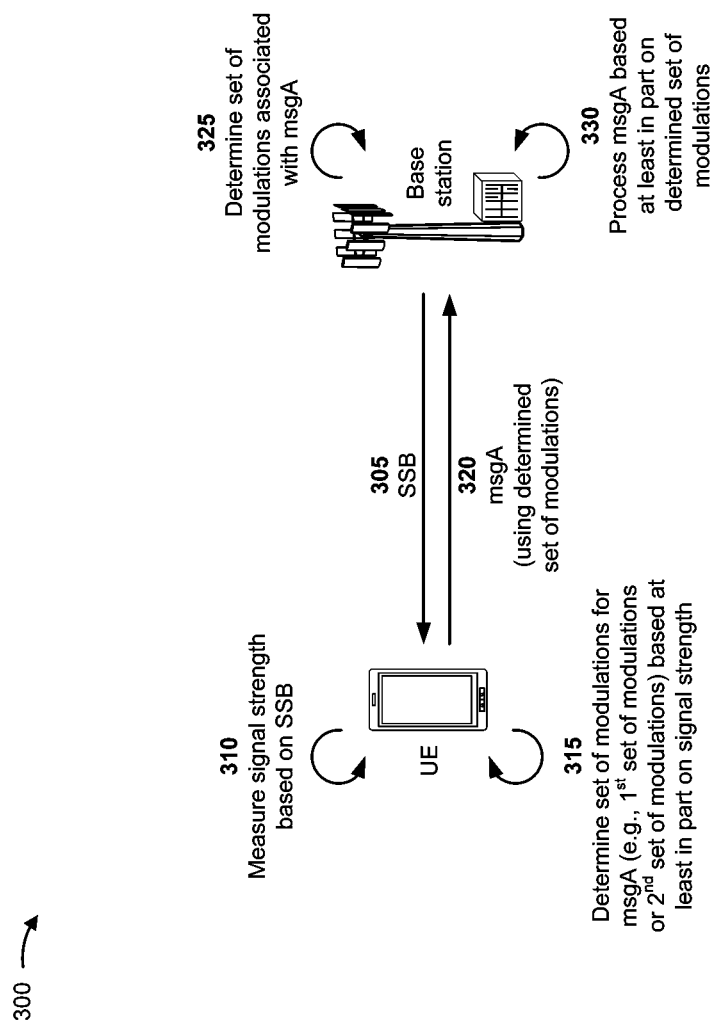
FIG. 3 is a diagram illustrating an example of selection of a set of modulations for a random access message in a two-step RACH procedure, in accordance with various aspects of the present disclosure.

FIG. 3 is a diagram illustrating an example 300 of selection of a set of modulations for a random access message in a two-step RACH procedure, in accordance with various aspects of the present disclosure.

As shown in FIG. 3 by reference 305, a base station (e.g., base station 110) may transmit a synchronization signal block (SSB) (e.g., using transmit processor 220, controller/processor 240, memory 242, transmission component 810, and/or the like). In some aspects, the SSB may include one or more synchronization signals and a physical broadcast channel (PBCH), as described below. In general, in association with transmitting a set of SSBs, the base station defines candidate positions for SSBs to be transmitted within a radio frame, and the quantity of a candidate positions corresponds to a quantity of beams radiated in a given direction. Here, each SSB transmitted by the base station may be associated with a respective SSB index. As further indicated by reference 305, a UE (e.g., UE 120) may receive (e.g., using receive processor 258, controller/processor 280, memory 282, reception component 604, and/or the like) an SSB transmitted by the base station.

As shown by reference 310, the UE may determine (e.g., using receive processor 258, controller/processor 280, memory 282, determination component 606, and/or the like) a signal strength based at least in part on a reference signal received power (RSRP) associated with the SSB. In some aspects, the UE may measure a signal strength of a reference signal (e.g., a demodulation reference signal (DMRS)) of each SSB detected by the UE (e.g., within a particular period of time, such as a period of one SSB set) and, based on results of these measurements, may identify an SSB for which the reference signal has a suitable (e.g., strongest) signal strength. Here, the SSB with the suitable signal strength uses a suitable (e.g., best) beam for the UE.

In some aspects, after identifying the suitable beam, the UE may then decode the PBCH associated with the SSB. The PBCH may carry, for example, system information (e.g., a master information block (MIB), one or more system information blocks (SIBs), and/or the like), a configuration for remaining minimum system information (RMSI), and one or more other items of information. Here, decoding the PBCH enables the UE to receive a subsequent physical downlink control channel (PDCCH) and a physical downlink shared channel (PDSCH) that schedule and carry, respectively, RMSI and other system information (OSI). In some aspects, the configuration of the PDCCH for the RMSI may be determined from the PBCH, and a control resource set (CORESET) configuration for the RMSI may be determined based at least in part on an SSB index of the SSB.

As indicated by reference 315, the UE may determine (e.g., using receive processor 258, transmit processor 264, controller/processor 280, memory 282, determination component 606, and/or the like) a set of modulations for a random access message associated with the two-step RACH procedure. In some aspects, the set of modulations may be either a first set of modulations or a second set of modulations (e.g., an alternative set of modulations that differs from the first set of modulations). In some aspects, the first set of modulations may include one or more modulations typically used for a first message in the two-step RACH procedure (e.g., when coverage enhancement is not provided), such as QPSK, 16 QAM, 64 QAM, and/or the like. In some aspects, the second one or more may include one or more modulations, such as π/2 BPSK modulation. In some aspects, the second set of modulations may be selected or designed so as to provide coverage enhancement for the random access message associated with the two-step RACH procedure.

In some aspects, the UE may determine the set of modulations based at least in part on whether the signal strength satisfies a signal strength threshold associated with identifying a set of modulations for a random access message for a two-step RACH procedure (herein referred to threshold Th). As an example, the UE may determine the signal strength based at least in part on the RSRP associated with the SSB, as described above. The UE may then compare the signal strength to the threshold Th. Here, if the signal strength satisfies the threshold Th (e.g., when the signal strength is greater than or equal to the threshold Th), then the UE may determine that the UE is to use the first set of modulations for the random access message of the two-step RACH procedure. Conversely, if the signal strength does not satisfy the threshold Th (e.g., when the signal strength is less than the threshold Th), then the UE may determine that the UE is to the second set of modulations for the random access message of the two-step RACH procedure. In some aspects, the threshold Th may be identified in system information (e.g., RMSI) received by the UE from the base station in the manner described above. Thus, in some aspects, the threshold Th may be configured on the UE by the base station.

As shown by reference 320, the UE may transmit (e.g., using transmit processor 264, controller/processor 280, memory 282, transmission component 608, and/or the like) the random access message, associated with the two-step RACH procedure, based at least in part on the determined set of modulations. That is, the UE may transmit the random access message such that the random access message includes a PUSCH modulated using the determined set of modulations. For example, the UE may transmit the random access message including a PUSCH modulated using the first set of modulations when the UE determines that the first set of modulations is to be used for the random access message of the two-step RACH procedure. Alternatively, the UE may transmit the random access message including a PUSCH modulated using the second set of modulations when the UE determines that the second set of modulations is to be used for the random access message of the two-step RACH procedure.

In some aspects, an amount of time between a preamble of the random access message and the PUSCH may be based at least in part on the determined set of modulations. For example, when the UE is to use the second set of modulations, the UE may be configured to transmit the random access message such that a gap between the preamble and the PUSCH is less than particular amount of time (e.g., 1 slot, 0.25 milliseconds, and/or the like). In such a case, the preamble of the random access message may be used for channel estimation enhancement of the PUSCH.

In some aspects, a set of PUSCH resource unit groups associated with the first set of modulations may be different from a set of PUSCH resource unit groups associated with the second set of modulations. For example, a PUSCH resource unit group associated with the second set of modulations may have more resource blocks (e.g., two times the number of resource blocks) than a PUSCH resource unit group associated with the first set of modulations. Thus, in some aspects, a size of PUSCH resource unit group and/or a selection of a PUSCH resource unit group may differ depending on the set of modulations used for the PUSCH.

In some aspects, a set of RACH occasions associated with the first set of modulations may be different from a set of RACH occasions associated with the second set of modulations. Further, in some aspects, a mapping between a resource allocation for a PUSCH occasion and a RACH occasion, associated with the first set of modulations, may be different from a mapping between a resource allocation for a PUSCH occasion and a RACH occasion associated with the second set of modulations. Thus, in some aspects, RACH occasion and/or a mapping between a resource allocation for a PUSCH occasion and a RACH occasion may differ depending on the set of modulations used for the PUSCH.

In some aspects, a payload of a random access message associated with the first set of modulations may be different from a payload of a random access message associated with the second set of modulations. For example, a PUSCH payload of a random access message that uses the second set of modulations may be different (e.g., may have fewer bits) than a PUSCH payload of a random access message that uses the first set of modulations. Thus, in some aspects, a size of the PUSCH payload may differ depending on the set of modulations used for the PUSCH.

In some aspects, a length of a preamble for a random access message that uses the first set of modulations may be different from a length of a preamble for a random access message that uses the second set of modulations. For example, a length of a preamble of a random access message that uses the second set of modulations may be different (e.g., greater than) a length of a preamble of a random access message that uses the first random access message. Thus, in some aspects, a length of the preamble may differ depending on the set of modulations used for the PUSCH.

In some aspects, application of preamble repetition associated with the first set of modulations may be different from application of preamble repetition associated with the second set of modulations. For example, preamble repetition may be applied for a random access message that uses the second set of modulations, while preamble repetition may not be applied for a random access message that uses the first set of modulations. Thus, in some aspects, application of preamble repetition may differ depending on the set of modulations used for the PUSCH.

In some aspects, a preamble sequence used for a random access message that uses the first set of modulations may be different from a preamble sequence used for a random access message that uses the second set of modulations. For example, a preamble sequence used for a random access message that uses the second set of modulations may be selected from a second set of preamble sequences, while a preamble sequence used for a random access message that uses the first set of modulations may be selected from a first set of preamble sequences. Thus, in some aspects, a preamble sequence for a random access message may differ depending on the set of modulations used for the PUSCH.

As shown by reference 325, the base station may receive (e.g., using receive processor 238, controller/processor 240, memory 242, reception component 804, and/or the like) the random access message associated with the two-step RACH procedure. The base station may determine (e.g., using receive processor 238, controller/processor 240, memory 242, determination component 806, and/or the like) the set of modulations associated with the random access message. For example, the base station may determine the set of modulations based at least in part on the format of the preamble (e.g., when the format of the preamble is a format associated with a given set of modulations). As another example, the base station may determine the set of modulations based at least in part on a length of a preamble of the random access message (e.g., when the length of the preamble is associated with a set of modulations). As another example, the base station may determine the set of modulations based at least in part on whether preamble repetition was applied for the random access message (e.g., when application of preamble repetition is indicative of a given set of modulations). As another example, the base station may determine the set of modulations based at least in part on a preamble sequence of the random access message (e.g., when the preamble sequence is one of a set of preamble sequences associated with a given set of modulations). As another example, the base station may determine the set of modulations based at least in part on a set of resources in which the random access message is received (e.g., when a set of resources in which random access messages are communicated is dependent on the set of modulations used). Thus, in some aspects, a format of a preamble of the random access message, a length of the preamble, repetition of the preamble, a preamble sequence, and/or a set of resources in which the random access message is transmitted may serve as an indication of the set of modulations used by the UE, and the base station may determine the set of modulations accordingly.

As shown by reference 330, the base station may process (e.g., using transmit processor 220, receive processor 238, controller/processor 240, memory 242, processing component 808, and/or the like) the random access message based at least in part on determining the set of modulations associated with the random access message. For example, after determining the set of modulations, the base station may demodulate the PUSCH based at least in part on the determined set of modulations, and may determine the payload of the random access message. The base station may then proceed with the two-step RACH procedure (e.g., by preparing and transmitting msgB).

As indicated above, FIG. 3 is provided as an example. Other examples may differ from what is described with respect to FIG. 3.

Figure 4:
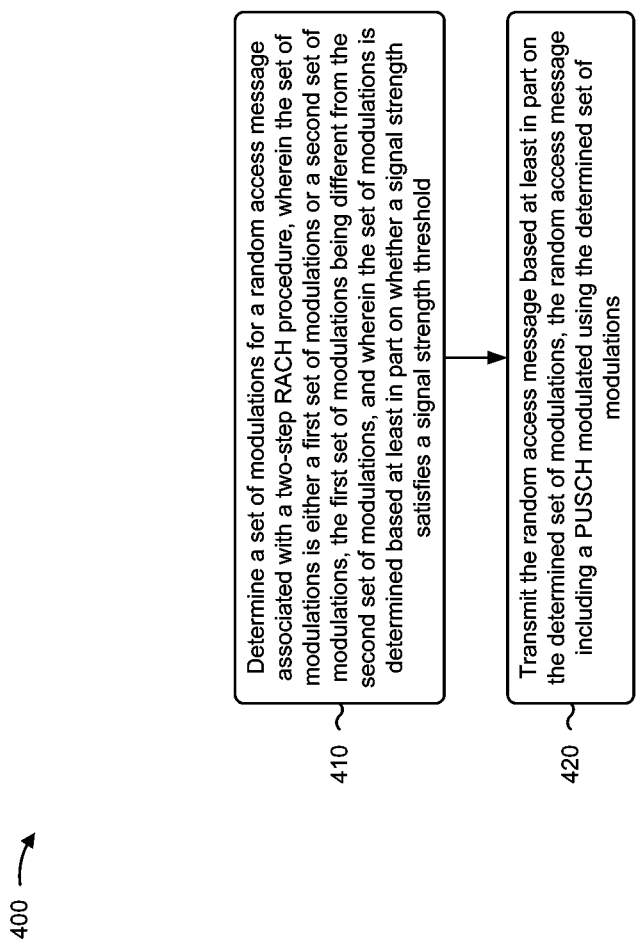
FIG. 4 is a diagram illustrating an example process performed, for example, by a user equipment, in accordance with various aspects of the present disclosure.

FIG. 4 is a diagram illustrating an example process 400 performed, for example, by UE, in accordance with various aspects of the present disclosure. Example process 400 is an example where the UE (e.g., UE 120 and/or the like) performs operations associated with alternative modulation for a random access message in a two-step random access procedure.

As shown in FIG. 4, in some aspects, process 400 may include determining a set of modulations for a random access message associated with a two-step RACH procedure (block 410). For example, the UE (e.g., using receive processor 258, transmit processor 264, controller/processor 280, memory 282, and/or the like) may determine a set of modulations for a random access message associated with a two-step RACH procedure (e.g., as described above in association with reference 315 of FIG. 3). In some aspects, the set of modulations is either a first set of modulations or a second set of modulations, the first set of modulations being different from the second set of modulations. In some aspects, the set of modulations is determined based at least in part on whether a signal strength satisfies a signal strength threshold.

As further shown in FIG. 4, in some aspects, process 400 may include transmitting the random access message based at least in part on the determined set of modulations (block 420). For example, the UE (e.g., using receive processor 258, transmit processor 264, controller/processor 280, memory 282, and/or the like) may transmit the random access message based at least in part on the determined set of modulations (e.g., as described above in association with reference 320 of FIG. 3). In some aspects, the random access message includes a PUSCH modulated using the determined set of modulations.

Process 400 may include additional aspects, such as any single aspect or any combination of aspects described below and/or in connection with one or more other processes described elsewhere herein.

In a first aspect, the signal strength threshold is identified in system information received by the UE.

In a second aspect, alone or in combination with the first aspect, the system information is carried by remaining minimum system information.

In a third aspect, alone or in combination with one or more of the first and second aspects, the set of modulations is determined to be the first set of modulations when the signal strength satisfies the signal strength threshold, and is determined to be the second set of modulations when the signal strength does not satisfy the signal strength threshold.

In a fourth aspect, alone or in combination with one or more of the first through third aspects, the second set of modulations is a π/2 binary phase shift keying scheme.

In a fifth aspect, alone or in combination with one or more of the first through fourth aspects, an amount of time between a preamble of the random access message and the PUSCH is based at least in part on the determined set of modulations.

In a sixth aspect, alone or in combination with one or more of the first through fifth aspects, the preamble of the random access message is used for channel estimation enhancement of the PUSCH.

In a seventh aspect, alone or in combination with one or more of the first through sixth aspects, a set of PUSCH resource unit groups associated with the first set of modulations is different from a set of PUSCH resource unit groups associated with the second set of modulations.

In an eighth aspect, alone or in combination with one or more of the first through seventh aspects, a set of RACH occasions associated with the first set of modulations is different from a set of RACH occasions associated with the second set of modulations.

In a ninth aspect, alone or in combination with one or more of the first through eighth aspects, a mapping between a resource allocation for a PUSCH occasion and a RACH occasion, associated with the first set of modulations, is different from a mapping between a resource allocation for a PUSCH occasion and a RACH occasion associated with the second set of modulations.

In a tenth aspect, alone or in combination with one or more of the first through ninth aspects, a payload of a random access message associated with the first set of modulations, is different from a payload of a random access message associated with the second set of modulations.

In an eleventh aspect, alone or in combination with one or more of the first through tenth aspects, process 400 includes receiving an SSB; and determining the signal strength based at least in part on a reference signal received power associated with the SSB.

In a twelfth aspect, alone or in combination with one or more of the first through eleventh aspects, a length of a preamble for a random access message that uses the first set of modulations is different from a length of a preamble for a random access message that uses the second set of modulations.

In a thirteenth aspect, alone or in combination with one or more of the first through twelfth aspects, application of preamble repetition for a random access message that uses the first set of modulations is different from application of preamble repetition for a random access message that uses the second set of modulations.

In a fourteenth aspect, alone or in combination with one or more of the first through thirteenth aspects, a preamble sequence used for a random access message that uses the first set of modulations is different from a preamble sequence used for a random access message that uses the second set of modulations.

In a fifteenth aspect, alone or in combination with one or more of the first through fourteenth aspects, at least one of a format of a preamble of the random access message, a length of the preamble, repetition of the preamble, a preamble sequence, or a set of resources in which the random access message is transmitted is used to indicate the determined set of modulations.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
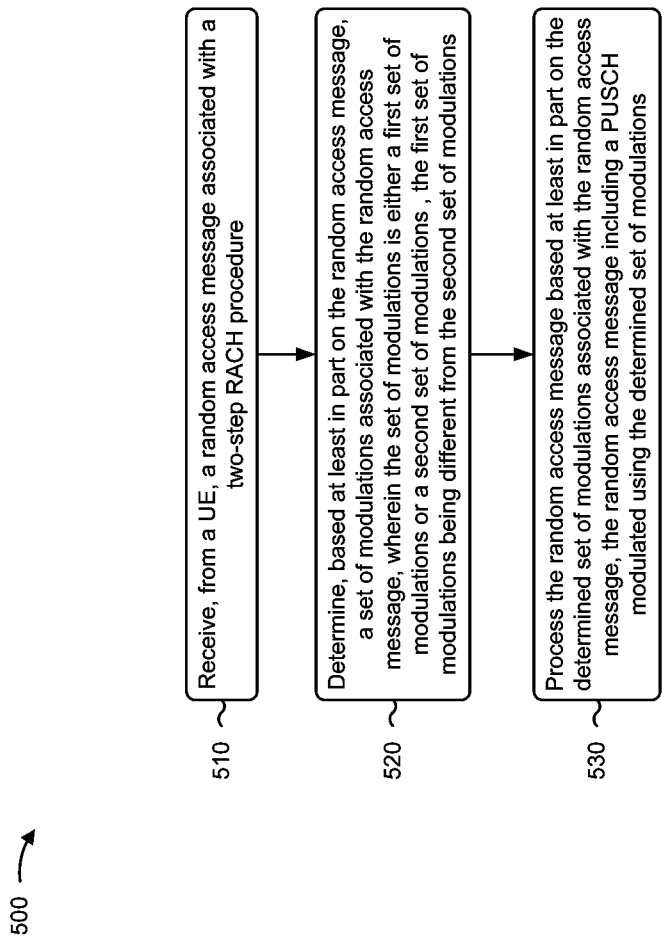
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 110 and/or the like) performs operations associated with alternative modulation for a random access message in a two-step random access procedure.

As shown in FIG. 5, in some aspects, process 500 may include receiving, from a UE, a random access message associated with a two-step RACH procedure (block 510). For example, the base station (e.g., using transmit processor 220, receive processor 238, controller/processor 240, memory 242, and/or the like) may receive, from a UE (e.g., a UE 120), a random access message associated with a two-step RACH procedure (e.g., as described above in association with reference 325 of FIG. 3).

As further shown in FIG. 5, in some aspects, process 500 may include determining, based at least in part on the random access message, a set of modulations associated with the random access message (block 520). For example, the base station (e.g., using transmit processor 220, receive processor 238, controller/processor 240, memory 242, and/or the like) may determine, based at least in part on the random access message, a set of modulations associated with the random access message (e.g., (e.g., as described above in association with reference 325 of FIG. 3). In some aspects, the set of modulations is either a first set of modulations or a second set of modulations, the first set of modulations being different from the second set of modulations.

As further shown in FIG. 5, in some aspects, process 500 may include processing the random access message based at least in part on the determined set of modulations associated with the random access message (block 530). For example, the base station (e.g., using transmit processor 220, receive processor 238, controller/processor 240, memory 242, and/or the like) may process the random access message based at least in part on the determined set of modulations associated with the random access message (e.g., as described above in association with reference 330 of FIG. 3). In some aspects, the random access message includes a PUSCH modulated using the determined set of modulations.

Process 500 may include additional aspects, such as any single aspect or any combination of aspects described below and/or in connection with one or more other processes described elsewhere herein.

In a first aspect, a signal strength threshold, associated with determining to use the second set of modulations, is identified in system information transmitted by the base station.

In a second aspect, alone or in combination with the first aspect, the system information is carried by remaining minimum system information.

In a third aspect, alone or in combination with one or more of the first and second aspects, the second set of modulations is a π/2 binary phase shift keying scheme.

In a fourth aspect, alone or in combination with one or more of the first through third aspects, an amount of time between a preamble of the random access message and the PUSCH is based at least in part on the determined set of modulations.

In a fifth aspect, alone or in combination with one or more of the first through fourth aspects, the preamble of the random access message is used for channel estimation enhancement of the PUSCH.

In a sixth aspect, alone or in combination with one or more of the first through fifth aspects, a set of PUSCH resource unit groups associated with the first set of modulations is different from a set of PUSCH resource unit groups associated with the second set of modulations.

In a seventh aspect, alone or in combination with one or more of the first through sixth aspects, a set of RACH occasions associated with the first set of modulations is different from a set of RACH occasions associated with the second set of modulations.

In an eighth aspect, alone or in combination with one or more of the first through seventh aspects, a mapping between a resource allocation for a PUSCH occasion and a RACH occasion, associated with the first set of modulations, is different from a mapping between a resource allocation for a PUSCH occasion and a RACH occasion associated with the second set of modulations.

In a ninth aspect, alone or in combination with one or more of the first through eighth aspects, a payload of a random access message associated with the first set of modulations, is different from a payload of a random access message associated with the second set of modulations. In a tenth aspect, alone or in combination with one or more of the first through ninth aspects, process 500 includes transmitting a SSB to enable a determination of a signal strength of a reference signal received power associated with the SSB.

In a tenth aspect, alone or in combination with one or more of the first through ninth aspects, a length of a preamble for a random access message that uses the first set of modulations is different from a length of a preamble for a random access message that uses the second set of modulations.

In an eleventh aspect, alone or in combination with one or more of the first through tenth aspects, application of preamble repetition for a random access message that uses the first set of modulations is different from application of preamble repetition for a random access message that uses the second set of modulations.

In a twelfth aspect, alone or in combination with one or more of the first through eleventh aspects, a preamble sequence used for a random access message that uses the first set of modulations is different from a preamble sequence used for a random access message that uses the second set of modulations.

In a thirteenth aspect, alone or in combination with one or more of the first through twelfth aspects, the set of modulations is determined based at least in part on at least one of a format of a preamble of the random access message, a length of the preamble, repetition of the preamble, a preamble sequence, or a set of resources in which the random access message is received.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
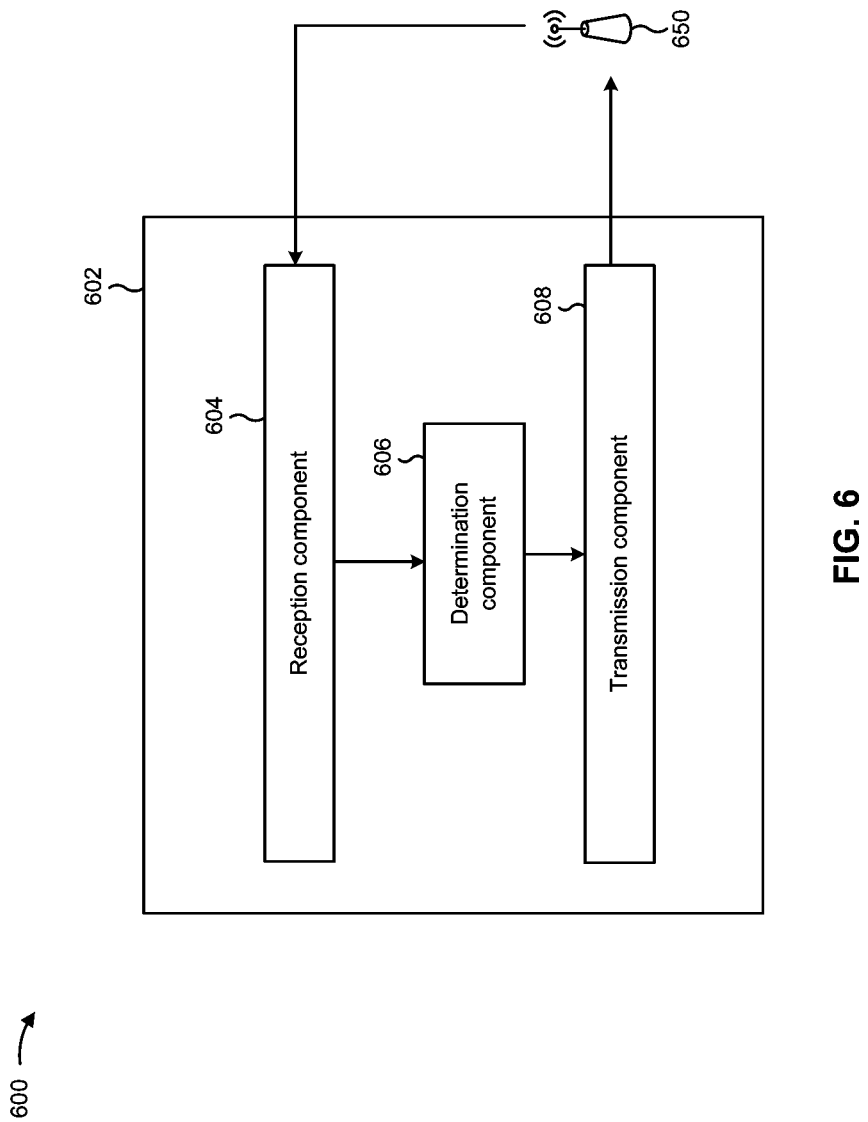
FIG. 6 is a conceptual data flow diagram illustrating an example of a data flow between different components in an example apparatus.

FIG. 6 is a conceptual data flow diagram 600 illustrating a data flow between different components in an example apparatus 602. The apparatus 602 may be a UE (e.g., UE 120). In some aspects, the apparatus 602 includes a reception component 604, a determination component 606, and/or a transmission component 608.

In some aspects, one or more components of apparatus 602 may operate to perform one or more operations described herein. For example, reception component 604 may operate to receive an SSB transmitted by a base station (e.g., base station 110). Determination component 606 may operate to determine a signal strength based at least in part on an RSRP associated with the SSB, and determine set of modulations for a random access message associated with a two-step RACH procedure based at least in part on whether a signal strength satisfies a signal strength threshold. Transmission component 608 may operate to transmit (e.g., to base station 650) the random access message based at least in part on the determined set of modulations.

The apparatus may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
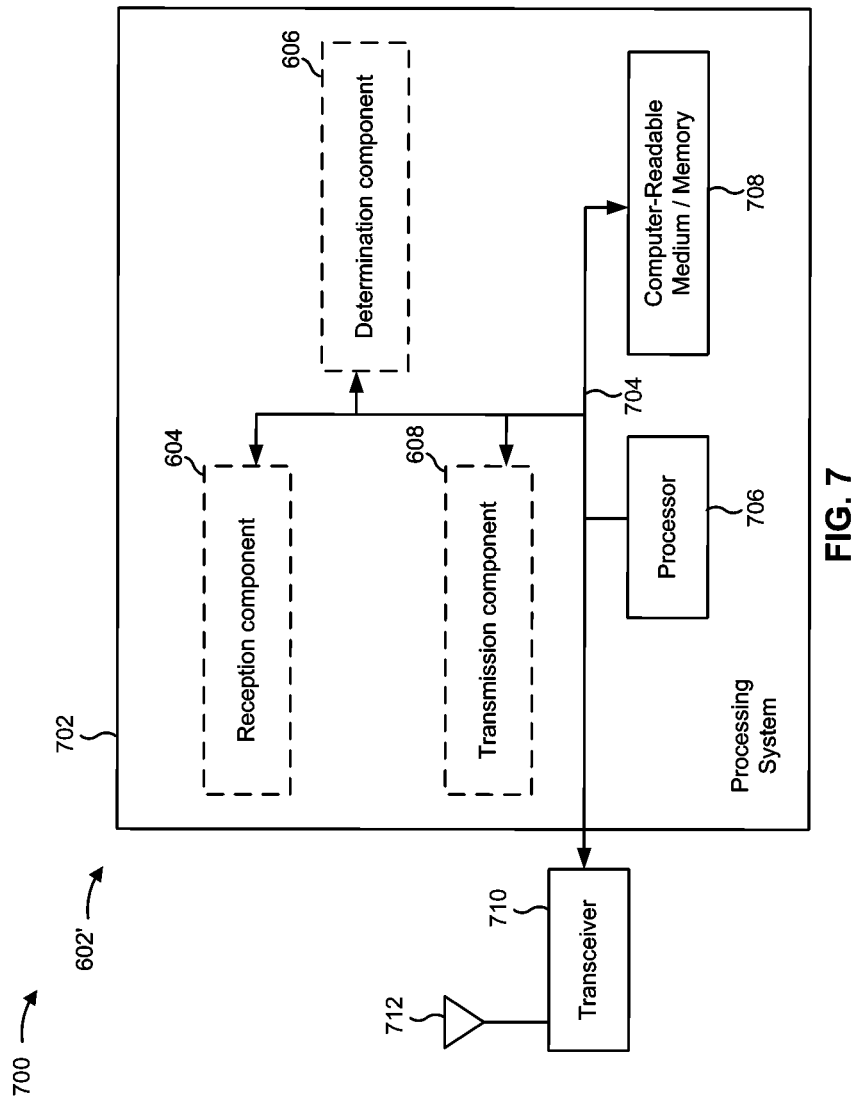
FIG. 7 is a diagram illustrating an example of a hardware implementation for an apparatus employing a processing system.

FIG. 7 is a diagram 700 illustrating an example of a hardware implementation for an apparatus 602' employing a processing system 702. The apparatus 602' may be a UE (e.g., a UE 120).

The processing system 702 may be implemented with a bus architecture, represented generally by the bus 704. The bus 704 may include any number of interconnecting buses and bridges depending on the specific application of the processing system 702 and the overall design constraints. The bus 704 links together various circuits including one or more processors and/or hardware components, represented by the processor 706, the components 604, 606, 608, and the computer-readable medium/memory 708. The bus 704 may also link various other circuits such as timing sources, peripherals, voltage regulators, and power management circuits, which are well known in the art, and therefore will not be described any further.

The processing system 702 may be coupled to a transceiver 710. The transceiver 710 is coupled to one or more antennas 712. The transceiver 710 provides a means for communicating with various other apparatuses over a transmission medium. The transceiver 710 receives a signal from the one or more antennas 712, extracts information from the received signal, and provides the extracted information to the processing system 702, specifically the reception component 604. In addition, the transceiver 710 receives information from the processing system 702, specifically the transmission component 608, and based at least in part on the received information, generates a signal to be applied to the one or more antennas 712. The processing system 702 includes a processor 706 coupled to a computer-readable medium/memory 708. The processor 706 is responsible for general processing, including the execution of software stored on the computer-readable medium/memory 708. The software, when executed by the processor 706, causes the processing system 702 to perform the various functions described herein for any particular apparatus. The computer-readable medium/memory 708 may also be used for storing data that is manipulated by the processor 706 when executing software. The processing system further includes at least one of the components 604, 606, and 608. The components may be software modules running in the processor 706, resident/stored in the computer readable medium/memory 708, one or more hardware modules coupled to the processor 706, or some combination thereof. The processing system 702 may be a component of the UE 120 and may include the memory 282 and/or at least one of the TX MIMO processor 266, the RX processor 258, and/or the controller/processor 280.

In some aspects, the apparatus 602/602' for wireless communication includes means for determining a set of modulations for a random access message associated with a two-step RACH procedure, wherein the set of modulations is either a first set of modulations or a second set of modulations, the first set of modulations being different from the second set of modulations, and wherein the set of modulations is determined based at least in part on whether a signal strength satisfies a signal strength threshold; means for transmitting the random access message based at least in part on the determined set of modulations, the random access message including a PUSCH modulated using the determined set of modulations; and/or the like. The aforementioned means may be one or more of the aforementioned components of the apparatus 602 and/or the processing system 702 of the apparatus 602' configured to perform the functions recited by the aforementioned means. As described elsewhere herein, the processing system 702 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 7 is provided as an example. Other examples may differ from what is described in connection with FIG. 7.

Figure 8:
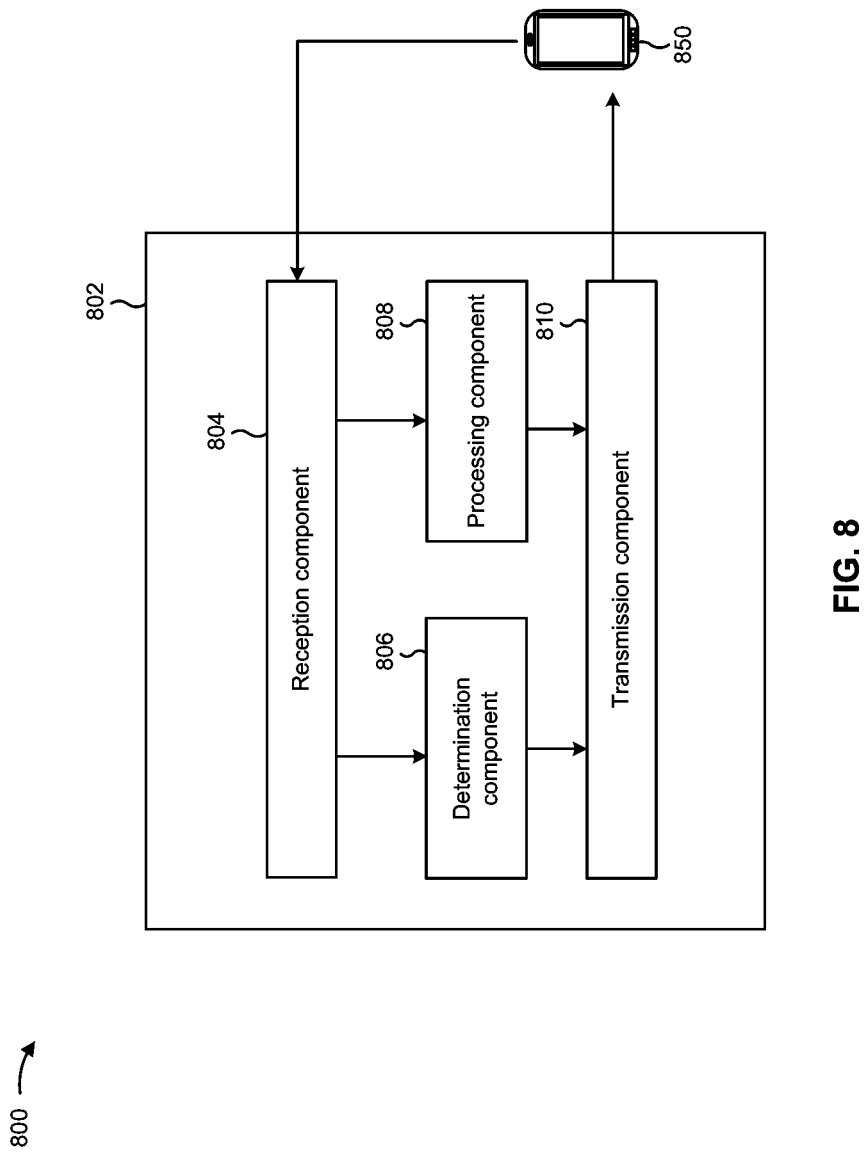
FIG. 8 is a conceptual data flow diagram illustrating an example of a data flow between different components in an example apparatus.

FIG. 8 is a conceptual data flow diagram 800 illustrating a data flow between different components in an example apparatus 802. The apparatus 802 may be a base station (e.g., base station 110). In some aspects, the apparatus 802 includes a reception component 804, a determination component 806, a processing component 808, and/or a transmission component 810.

In some aspects, one or more components of apparatus 802 may operate to perform one or more operations described herein. For example, reception component 804 may operate to receive (e.g., from a UE 850) a random access message, associated with a two-step RACH procedure. Determination component 806 may determine, based at least in part on the random access message, a set of modulations associated with the random access message. Processing component 808 may process the random access message based at least in part on the determined set of modulations associated with the random access message. Transmission component 810 may transmit an SSB for reception by the UE and/or may transmit (e.g., to the UE 850) a random access response (e.g., msgB) associated with the random access message.

The apparatus may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

Figure 9:
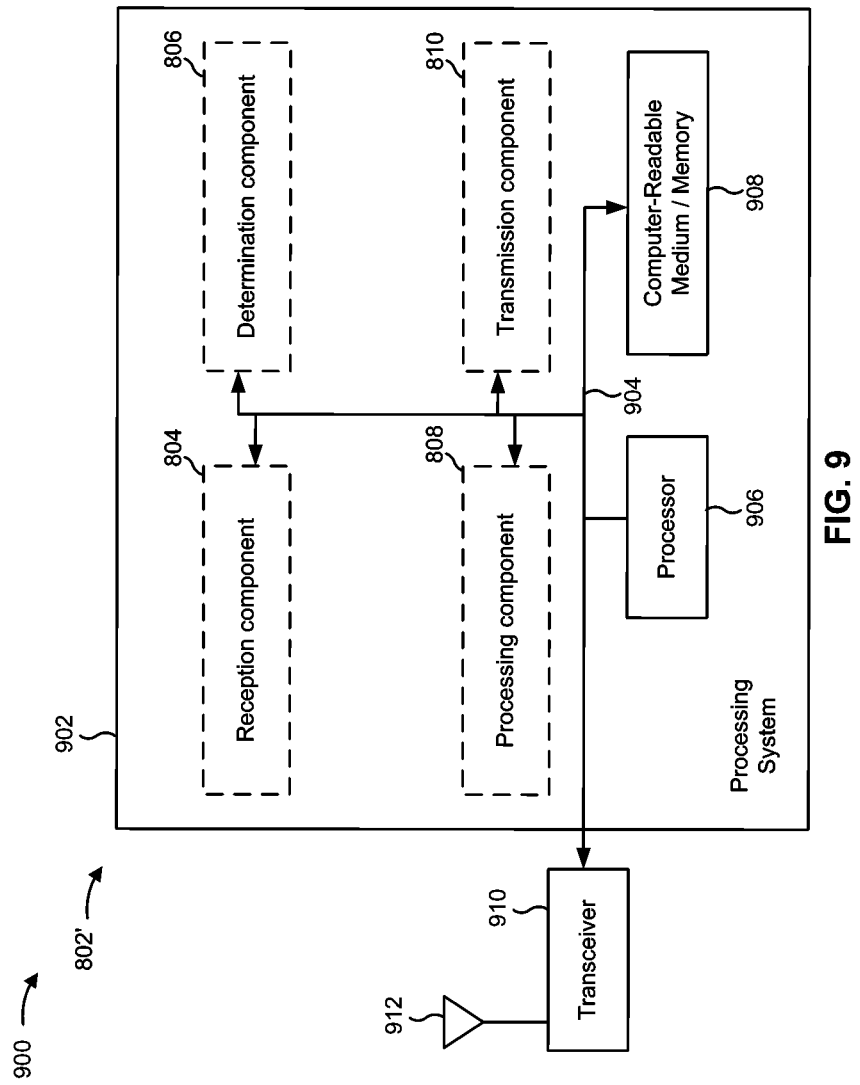
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a base station (e.g., base station 110).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware components, represented by the processor 906, the components 804, 806, 808, 810 and the computer-readable medium/memory 908. The bus

904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception component 804. In addition, the transceiver 910 receives information from the processing system 902, specifically the transmission component 810, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the components 804, 806, 808, and 810. The components may be software modules running in the processor 906, resident/stored in the computer readable medium/memory 908, one or more hardware modules coupled to the processor 906, or some combination thereof. The processing system 902 may be a component of the base station 110 and may include the memory 242 and/or at least one of the TX MIMO processor 230, the RX processor 238, and/or the controller/processor 240.

In some aspects, the apparatus 802/802' for wireless communication includes means for receiving, from a UE (e.g., a UE 120), a random access message associated with a two-step RACH procedure; means for determining, based at least in part on the random access message, a set of modulations associated with the random access message, wherein the set of modulations is either a first set of modulations or a second set of modulations, the first set of modulations being different from the second set of modulations; means for processing the random access message based at least in part on the determined set of modulations associated with the random access message, the random access message including a PUSCH modulated using the determined set of modulations; and/or the like. The aforementioned means may be one or more of the aforementioned components of the apparatus 802 and/or the processing system 902 of the apparatus 802' configured to perform the functions recited by the aforementioned means. As described elsewhere herein, the processing system 902 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 9 is provided as an example. Other examples may differ from what is described in connection with FIG. 9.

The following provides an overview of aspects of the present disclosure:

Aspect 1: A method of wireless communication performed by a user equipment (UE), comprising: determining a set of modulations for a random access message associated with a two-step random access channel (RACH) procedure, wherein the set of modulations is either a first set of modulations or a second set of modulations, the first set of modulations being different from the second set of modulations, and wherein the set of modulations is determined based at least in part on whether a signal strength satisfies a signal strength threshold; and transmitting the random access message based at least in part on the determined set of modulations, the random access message including a physical uplink shared channel (PUSCH) modulated using the determined set of modulations.

Aspect 2: The method of aspect 1, further comprising receiving system information from a base station, wherein the signal strength threshold is identified in the system information received by the UE.

Aspect 3: The method of any of aspects 1-2, further comprising receiving the signal strength threshold in system information comprising remaining minimum system information.

Aspect 4: The method of any of aspects 1-3, wherein determining the set of modulations comprises determining the set of modulations to be the first set of modulations when the signal strength satisfies the signal strength threshold and determining the set of modulations to be the second set of modulations when the signal strength does not satisfy the signal strength threshold.

Aspect 5: The method of aspect 4, wherein the second set of modulations is a $\pi/2$ binary phase shift keying scheme.

Aspect 6: The method of any of aspects 1-5, wherein transmitting the random access message comprises transmitting the random access message with an amount of time between a preamble of the random access message and the PUSCH, wherein the amount of time is based at least in part on the determined set of modulations.

Aspect 7: The method of aspect 6, wherein the preamble of the random access message is used for channel estimation enhancement of the PUSCH.

Aspect 8: The method of any of aspects 1-7, wherein transmitting the random access message comprises transmitting the random access message using a set of PUSCH resource unit groups, wherein the set of PUSCH resource unit groups when the first set of modulations is determined is different from the set of PUSCH resource unit groups when the second set of modulations is determined.

Aspect 9: The method of any of aspects 1-8, wherein transmitting the random access message comprises transmitting the random access message based on a set of RACH occasions, wherein the set of RACH occasions when the first set of modulations is determined is different from the set of RACH occasions when the second set of modulations is determined.

Aspect 10: The method of any of aspects 1-9, wherein transmitting the random access message comprises transmitting the random access message based on a mapping between a resource allocation for a PUSCH occasion and a RACH occasion, wherein the mapping when the first set of modulations is determined is different from the mapping when the second set of modulations is determined.

Aspect 11: The method of any of aspects 1-10, wherein transmitting the random access message comprises transmitting a payload of the random access message, wherein the payload when the first set of modulations is determined is different from the payload when the second set of modulations is determined.

Aspect 12: The method of any of aspects 1-11, transmitting the random access message comprises transmitting a preamble for the random access message, wherein a length of the preamble when the first set of modulations is determined is different from the length of the preamble when the second set of modulations is determined.

Aspect 13: The method of any of aspects 1-12, wherein transmitting the random access message comprises applying preamble repetition for the random access message if the first set of modulations is determined and not applying preamble repetition if the second set of modulations is determined.

Aspect 14: The method of any of aspects 1-13, wherein transmitting the random access message comprises transmitting a preamble sequence, wherein the preamble sequence when the first set of modulations is determined is different from the preamble sequence when the second set of modulations is determined.

Aspect 15: The method of any of aspects 1-14, transmitting the random access message comprises transmitting an indication of the determined set of modulations, wherein the indication is transmitted via at least one of a format of a preamble of the random access message, a length of the preamble, repetition of the preamble, a preamble sequence, or a set of resources in which the random access message is transmitted.

Aspect 16: The method of any of aspects 1-15, further comprising: receiving a synchronization signal block (SSB); and determining the signal strength based at least in part on a reference signal received power associated with the SSB.

Aspect 17: A method of wireless communication performed by a base station, comprising: receiving, from a user equipment (UE), a random access message associated with a two-step random access channel (RACH) procedure; determining, based at least in part on the random access message, a set of modulations associated with the random access message, wherein the set of modulations is either a first set of modulations or a second set of modulations, the first set of modulations being different from the second set of modulations; and processing the random access message based at least in part on the determined set of modulations associated with the random access message, the random access message including a physical uplink shared channel (PUSCH) modulated using the determined set of modulations.

Aspect 18: The method of aspect 17, further comprising transmitting system information that identifies a signal strength threshold associated with determining to use the second set of modulations.

Aspect 19: The method of any of aspects 17-18, further comprising transmitting the signal strength threshold in system information comprising remaining minimum system information.

Aspect 20: The method of any of aspects 17-19, wherein the second set of modulations is a $\pi/2$ binary phase shift keying scheme.

Aspect 21: The method of any of aspects 17-20, wherein receiving the random access message comprises receiving the random access message with an amount of time between a preamble of the random access message and the PUSCH, wherein the amount of time is based at least in part on the determined set of modulations.

Aspect 22: The method of aspect 21, wherein the preamble of the random access message is used for channel estimation enhancement of the PUSCH.

Aspect 23: The method of any of aspects 17-22, receiving the random access message comprises receiving the random access message using a set of PUSCH resource unit groups, wherein the set of PUSCH resource unit groups when the first set of modulations is determined is different from the set of PUSCH resource unit groups when the second set of modulations is determined.

Aspect 24: The method of any of aspects 17-23, wherein receiving the random access message comprises receiving the random access message based on a set of RACH occasions, wherein the set of RACH occasions when the first set of modulations is determined is different from the set of RACH occasions when the second set of modulations is determined.

Aspect 25: The method of any of aspects 17-24, wherein receiving the random access message comprises receiving the random access message based on a mapping between a resource allocation for a PUSCH occasion and a RACH occasion, wherein the mapping when the first set of modulations is determined is different from the mapping when the second set of modulations is determined.

Aspect 26: The method of any of aspects 17-25, wherein receiving the random access message comprises receiving a payload of the random access message, wherein the payload when the first set of modulations is determined is different from the payload when the second set of modulations is determined.

Aspect 27: The method of any of aspects 17-26, further comprising transmitting a synchronization signal block (SSB) to enable a determination of a signal strength of a reference signal received power associated with the SSB.

Aspect 28: The method of any of aspects 17-27, wherein receiving the random access message comprises receiving a preamble for the random access message, wherein a length of the preamble when the first set of modulations is determined is different from the length of the preamble when the second set of modulations is determined.

Aspect 29: The method of any of aspects 17-28, wherein receiving the random access message comprises applying preamble repetition for the random access message if the first set of modulations is determined and not applying preamble repetition if the second set of modulations is determined.

Aspect 30: The method of any of aspects 17-29, wherein receiving the random access message comprises receiving a preamble sequence, wherein the preamble sequence when the first set of modulations is determined is different from the preamble sequence when the second set of modulations is determined.

Aspect 31: The method of any of aspects 17-30, determining the set of modulations comprises receiving an indication of the determined set of modulations, wherein the indication is received via at least one of a format of a preamble of the random access message, a length of the preamble, repetition of the preamble, a preamble sequence, or a set of resources in which the random access message is received.

Aspect 32: An apparatus for wireless communication at a device, comprising a processor; memory coupled with the processor; and instructions stored in the memory and executable by the processor to cause the apparatus to perform the method of one or more aspects of aspects 1-16.

Aspect 33: A device for wireless communication, comprising a memory and one or more processors coupled to the memory, the memory and the one or more processors configured to perform the method of one or more aspects of aspects 1-16.

Aspect 34: An apparatus for wireless communication, comprising at least one means for performing the method of one or more aspects of aspects 1-16.

Aspect 35: A non-transitory computer-readable medium storing code for wireless communication, the code comprising instructions executable by a processor to perform the method of one or more aspects of aspects 1-16.

Aspect 36: A non-transitory computer-readable medium storing a set of instructions for wireless communication, the set of instructions comprising one or more instructions that, when executed by one or more processors of a device, cause the device to perform the method of one or more aspects of aspects 1-16.

Aspect 37: An apparatus for wireless communication at a device, comprising a processor; memory coupled with the processor; and instructions stored in the memory and executable by the processor to cause the apparatus to perform the method of one or more aspects of aspects 17-31.

Aspect 38: A device for wireless communication, comprising a memory and one or more processors coupled to the memory, the memory and the one or more processors configured to perform the method of one or more aspects of aspects 17-31.

Aspect 39: An apparatus for wireless communication, comprising at least one means for performing the method of one or more aspects of aspects 17-31.

Aspect 40: A non-transitory computer-readable medium storing code for wireless communication, the code comprising instructions executable by a processor to perform the method of one or more aspects of aspects 17-31.

Aspect 41: A non-transitory computer-readable medium storing a set of instructions for wireless communication, the set of instructions comprising one or more instructions that, when executed by one or more processors of a device, cause the device to perform the method of one or more aspects of aspects 17-31.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a set of modulations for a random access message associated with a two-step random access channel (RACH) procedure,
   wherein the set of modulations is either a first set of modulations or a second set of modulations, the first set of modulations being different from the second set of modulations, and
   wherein the set of modulations is determined based at least in part on whether a signal strength satisfies a signal strength threshold; and
   transmitting the random access message based at least in part on the determined set of modulations, the random access message including a physical uplink shared channel (PUSCH) modulated using the determined set of modulations.

2. The method of claim 1, further comprising receiving system information from a base station, wherein the signal strength threshold is identified in the system information received by the UE.

3. The method of claim 1, further comprising receiving the signal strength threshold in system information comprising remaining minimum system information.

4. The method of claim 1, wherein determining the set of modulations comprises determining the set of modulations to be the first set of modulations when the signal strength satisfies the signal strength threshold and determining the set of modulations to be the second set of modulations when the signal strength does not satisfy the signal strength threshold.

5. The method of claim 4, wherein the second set of modulations is a $\pi/2$ binary phase shift keying scheme.

6. The method of claim 1, wherein transmitting the random access message comprises transmitting the random access message with an amount of time between a preamble of the random access message and the PUSCH, wherein the amount of time is based at least in part on the determined set of modulations.

7. The method of claim 6, wherein the preamble of the random access message is used for channel estimation enhancement of the PUSCH.

8. The method of claim 1, wherein transmitting the random access message comprises transmitting the random access message using a set of PUSCH resource unit groups, wherein the set of PUSCH resource unit groups when the first set of modulations is determined is different from the set of PUSCH resource unit groups when the second set of modulations is determined.

9. The method of claim 1, wherein transmitting the random access message comprises transmitting the random access message based on a set of RACH occasions, wherein the set of RACH occasions when the first set of modulations is determined is different from the set of RACH occasions when the second set of modulations is determined.

10. The method of claim 1, wherein transmitting the random access message comprises transmitting the random access message based on a mapping between a resource allocation for a PUSCH occasion and a RACH occasion, wherein the mapping when the first set of modulations is determined is different from the mapping when the second set of modulations is determined.

11. The method of claim 1, wherein transmitting the random access message comprises transmitting a payload of the random access message, wherein the payload when the first set of modulations is determined is different from the payload when the second set of modulations is determined.

12. The method of claim 1, wherein transmitting the random access message comprises transmitting a preamble for the random access message, wherein a length of the preamble when the first set of modulations is determined is different from the length of the preamble when the second set of modulations is determined.

13. The method of claim 1, wherein transmitting the random access message comprises applying preamble repetition for the random access message if the first set of modulations is determined and not applying preamble repetition if the second set of modulations is determined.

14. The method of claim 1, wherein transmitting the random access message comprises transmitting a preamble sequence, wherein the preamble sequence when the first set of modulations is determined is different from the preamble sequence when the second set of modulations is determined.

15. The method of claim 1, wherein transmitting the random access message comprises transmitting an indication of the determined set of modulations, wherein the indication is transmitted via at least one of a format of a preamble of the random access message, a length of the preamble, repetition of the preamble, a preamble sequence, or a set of resources in which the random access message is transmitted.

16. The method of claim 1, further comprising:
receiving a synchronization signal block (SSB); and
determining the signal strength based at least in part on a reference signal received power associated with the SSB.

17. A method of wireless communication performed by a base station, comprising:
transmitting system information, to a user equipment (UE), that identifies a signal strength threshold;
receiving, from the UE, a random access message associated with a two-step random access channel (RACH) procedure, wherein the signal strength threshold is associated with identifying a set of modulations for the random access message for the two-step RACH procedure;
determining, based at least in part on the random access message, the set of modulations associated with the random access message,
wherein the set of modulations is either a first set of modulations or a second set of modulations, the first set of modulations being different from the second set of modulations; and
processing the random access message based at least in part on the determined set of modulations associated with the random access message, the random access message including a physical uplink shared channel (PUSCH) modulated using the determined set of modulations.

18. The method of claim 17, wherein transmitting the system information that identifies a signal strength threshold comprises transmitting the signal strength threshold in remaining minimum system information.

19. The method of claim 17, wherein the second set of modulations is a $\pi/2$ binary phase shift keying scheme.

20. The method of claim 17, wherein receiving the random access message comprises receiving the random access message with an amount of time between a preamble of the random access message and the PUSCH, wherein the amount of time is based at least in part on the determined set of modulations.

21. The method of claim 17, wherein receiving the random access message comprises receiving the random access message using a set of PUSCH resource unit groups, wherein the set of PUSCH resource unit groups when the first set of modulations is determined is different from the set of PUSCH resource unit groups when the second set of modulations is determined.

22. The method of claim 17, wherein receiving the random access message comprises receiving the random access message based on a set of RACH occasions, wherein the set of RACH occasions when the first set of modulations is determined is different from the set of RACH occasions when the second set of modulations is determined.

23. The method of claim 17, wherein receiving the random access message comprises receiving the random access message based on a mapping between a resource allocation for a PUSCH occasion and a RACH occasion, wherein the mapping when the first set of modulations is determined is different from the mapping when the second set of modulations is determined.

24. The method of claim 17, wherein receiving the random access message comprises receiving a payload of the random access message, wherein the payload when the first set of modulations is determined is different from the payload when the second set of modulations is determined.

25. The method of claim 17, wherein receiving the random access message comprises receiving a preamble for the random access message, wherein a length of the preamble when the first set of modulations is determined is different from the length of the preamble when the second set of modulations is determined.

26. The method of claim 17, wherein receiving the random access message comprises applying preamble repetition for the random access message if the first set of modulations is determined and not applying preamble repetition if the second set of modulations is determined.

27. The method of claim 17, wherein receiving the random access message comprises receiving a preamble sequence, wherein the preamble sequence when the first set of modulations is determined is different from the preamble sequence when the second set of modulations is determined.

28. The method of claim 17, wherein determining the set of modulations comprises receiving an indication of the determined set of modulations, wherein the indication is received via at least one of a format of a preamble of the random access message, a length of the preamble, repetition of the preamble, a preamble sequence, or a set of resources in which the random access message is received.

29. A user equipment (UE) for wireless communication, comprising:
   a memory; and
   one or more processors operatively coupled to the memory, the memory and the one or more processors configured to:
      determine a set of modulations for a random access message associated with a two-step random access channel (RACH) procedure,
      wherein the set of modulations is either a first set of modulations or a second set of modulations, the first set of modulations being different from the second set of modulations, and
      wherein the set of modulations is determined based at least in part on whether a signal strength satisfies a signal strength threshold; and
      transmit the random access message based at least in part on the determined set of modulations, the random access message including a physical uplink shared channel (PUSCH) modulated using the determined set of modulations.

30. A base station for wireless communication, comprising:
   a memory; and
   one or more processors operatively coupled to the memory, the memory and the one or more processors configured to:
      transmit system information, to a user equipment (UE), that identifies a signal strength threshold;
      receive, from the UE, a random access message associated with a two-step random access channel (RACH) procedure, wherein the signal strength threshold is associated with identifying a set of modulations for the random access message for the two-step RACH procedure;
      determine, based at least in part on the random access message, a set of modulations associated with the random access message,
      wherein the set of modulations is either a first set of modulations or a second set of modulations, the first set of modulations being different from the second set of modulations; and
      process the random access message based at least in part on the determined set of modulations associated with the random access message, the random access message including a physical uplink shared channel (PUSCH) modulated using the determined set of modulations.

* * * * *